UNITED STATES PATENT OFFICE 2,516,923

PROCESSING OF MEAT

Oscar E. Schotté, Amherst, Mass., assignor, by direct and mesne assignments, of fifty-two and one-half per cent to The Trustees of Amherst College, a corporation of Massachusetts No Drawing. Application January 20, 1948, Serial No. 3,364

5 Claims. (Cl. 99—107)

This invention relates to food animals and its primary object is to provide a process for improving the food value of the meat of the animals.

Another object of the invention is to provide a process for improving or modifying the flavor of the meat of a food animal.

A further object of the invention is to provide a process for improving the food value of an animal that avoids the necessity of costly and wasteful natural feeding processes.

A more specific object of the invention is to provide a process for the utilization of the waste fats of one food animal to increase the food value and modify the flavor of another food animal of the same or different species.

A further object of the invention is to provide a process for the utilization of the waste fats of a food animal naturally fed on one type of feed to increase the food value and modify the flavor of another food animal fed naturally on a different type of feed.

With the foregoing and other objects in view, the invention resides in the following specification and appended claims.

It is known that the desirability of steak and other meat cuts depends not only upon special racial and genetic characteristics of the beef cattle, but also on the age, care and particularly the food of the meat cattle. An especially desirable feature of the better cuts is the so-called "marbling" of the meat, the latter representing solely the visible pattern of degenerated connective tissue cells filled in the case of beef cattle with tallow.

A microscopic study concerned with the intimate structure of meat reveals that its main tissue, the muscular tissue, is extremely well supplied with blood vessels. No muscular activity is possible without a continuous supply of the arterial system of oxygen and of blood sugar with subsequent removal of the waste products by the venous blood system. Every single muscle cell or fiber is surrounded by a network of blood capillaries. The individual muscle fibers, each supplied with its own capillary network, group themselves into small bundles of a few muscle fibers surrounded by connective tissue cells within which are situated other and larger capillaries, small arteries and veins. These primary bundles are grouped into secondary bundles and so forth until a large muscle is formed by the grouping of primary, secondary, tertiary and quaternary bundles. As the bundles become larger a richly vascularised network of connective tissue and blood vessels simultaneously isolates and binds these muscle bundles together thus providing ample space for the extensive blood circulatory system.

Fat deposit with subsequent "marbling" of the meat is due to the sluggish metabolism which take place within the essentially inactive connective tissue cells situated in the interspaces between two very active tissues, the muscular tissue and the blood vascular tissue. Unfortunately, since fat deposit is the result of surplus matabolism of the organism, it is impossible to obtain the desirable delicate "marbling" within so active a tissue as the muscular tissue without the simultaneous deposit in less active parts of the body of large, and for consumptive purposes, totally undesirable quantities of fatty tissues.

"Marbling" of meat occurs normally as a result of age in all cattle, but then the meat is undesirable because of toughness. It also occurs as a result of deliberate overfeeding of young grass fed cattle with costly farm produce. The fattening of beef cattle by the grain feeding method as practiced by the cattle industry reveals itself to be a highly wasteful process for two fundamental reasons. First an enormous waste of grain materials results from the bare maintenance of the life functions of the cattle. Secondly, the fattening of cattle in this manner is wasteful because the desirable "marbling" of the edible meat portions can be obtained only after excessive and unnecessary layers of fat have been made to form at different portions of the body where the demands on locomotion are slight and where the amounts of muscle tissue are scant.

This invention proposes to eliminate completely or to greatly shorten the grain feeding process of fattening cattle by obtaining a deposit of fat within and around the muscle bundles of the meat to approach the desirable effects of "marbling." This is achieved artifically by the feeding or injection under pressure of melted tallow, lard or other fats into the blood circulatory system, thus achieving distribution of fat in all the connective interspaces of the muscle bundles and particularly in the capillary network which encloses like a basket every single muscle fiber of the animal body.

The invention further proposes to introduce into the body of one type of food animal by the blood circulatory system substances of an origin extraneous to the animal to be so treated at time of slaughter. The exchange of fatty products of one animal to another, such as a beef to a hog, and vice-versa, would then result in the introduction through the blood vascular channels of melted lard of hogs into beef and of melted tallow of beef into hogs. It is contemplated that by this process the food market will become enriched by the introduction of a different tasting substance into the meat of another animal which has a traditionally known special taste, not always to the liking of everyone. Thus, the sometimes objectionably strong flavor of mutton may be modified by the introduction of lard or tallow into the blood circulatory system of sheep or mutton.

The means for carrying the invention into practice are similar to that used by morticians in preserving cadavers and by the meat industry in preserving meats. There is, however, one important detail by which this invention differs from all the previously known and patented methods for preserving meats, other than the concept of the invention itself as compared to preserving concepts. This difference is that the nutriments or fats contemplated for injection are solid at ordinary room temperature, and the process of improving the meat of the animal to be slaughtered is necessarily performed at temperatures above the melting points of the fats used; to wit, at a temperature above the body temperature of the animal.

The artificial feeding process with its ramifications as regards cattle and hogs is as follows:

First, the food animal is stunned by the methods used presently in slaughter houses with the exception that bleeding is prevented. Subsequent to the stunning the chained animal is placed on its back for convenient approach to the general heart region.

Secondly, an opening is then made through the median and anterior portion of the thoracic cavity with the object of exposing the heart and the main blood vessels of which, however, for the purposes of the present invention only the most proximal portion of the aorta is essential.

Thirdly, a slot is made through any convenient region of the left ventricle and an injection nozzle is inserted through this slot first into the left ventricle past the bicuspid valves and is finally lodged in the proximal portion of the aorta. The invention proposes the use of a ligature behind the inflated end of the nozzle so as to prevent its slipping out of the aorta when pressure is applied. Another slot is then made in the right ventricle of the heart and a canule inserted therein to drain the systemic blood while the heart is still beating. This latter insertion will insure the proper escape or drainage of the remaining blood and subsequently also of the physiologic salt solution. It is immaterial whether the drainage pipe or the injection nozzle is affixed to the above mentioned places of the heart first, but it has been found preferable to affix the drainage pipe or canule first, because the blood draining may proceed while the injection nozzle is being affixed.

The aortal injection nozzle is then connected by hoses to two supply tanks the contents of which can be forced under pressure at the will of the operator into the hoses. One of the tanks contains a edible non-toxic salt solution and the other the melted fats. Both tanks, besides being maintained at temperatures above the body temperature of the food animal being treated, are connected with pumps destined to provide a sufficient head pressure on each tank to make it possible to propel the liquids of each tank with a constant force sufficiently strong to overcome the resistance offered to the passage of the injection substances through the smallest capillaries. The arrangement of the tanks, of the injection hose, and of the stop cock system are technical details and are all based on known principles which have found widespread application in surgical practice and in industry.

The fourth step of the process is to connect the aortal nozzle with the edible salt solution which has a temperature level of about 41 degrees centigrade. This solution is made to stream through the arterial system thereby chasing the blood first through the main arteries, then the lesser arteries, the arterioles and finally the finest capillaries. Due to the pressure applied, the blood and subsequently the salt solution are forced from the arterial system into the venous system, thereby chasing the blood through the returning systemic veins toward the heart. Since the right ventricle of the heart is connected to a drainage reservoir by means of the previously inserted pipe, the blood, first pure, then diluted, and finally pure salt solution are forced out of the heart and at the moment when the solution runs clear, all the blood has been flushed out of the animal's body. The heated salt solution performs two functions; that of flushing the system and that of heating the system to prevent collapse and contractions of portions of the system.

The fifth step of the process is to switch injection supply tanks by turning a stop cock so that the injection fat tank will permit its contents to be propelled into the animal through the injection nozzle. To insure a smooth flow the temperature of the injection nutriment tank is maintained at least three to four degrees centigrade above the melting point of the nutriment. The injection is successfully completed when the drainage pipe inserted into the right ventricle flows clear with the injection fat.

These injection and drainage steps need not necessarily be performed through the heart to the exclusion of other blood vessels. Satisfactory results are achieved by injection methods through the arteries and veins of the neck and of the extremities, even though these blood vessels will not stand as much pressure as does the aorta.

Also, it will often be considered undesirable to allow the whole body to be permeated with the injected fat. It is particularly superfluous to inject the great mass of bowels, the liver, spleen, pancreas and lungs with the nutriment while a simple operation of ligation of a main artery can prevent this from occurring. Since the organs of the whole abdominal cavity are supplied by the common coeliac trunk and the mesenteric arteries, these organs may be by-passed by ligating these arteries while the process of flushing the blood of the animal is progressing.

The sixth and final step of the process is to cool the food animal so injected with fat below the melting point of the fat to insure solidification of said fat throughout the blood circulatory system of the animal. After sufficient time has passed, depending on the fat and cooling temperature used, the animal may be butchered according to standard methods.

It is the filling of the channels of the circulatory system with a melted fatty substance with or without additions of other mixtures which is essential, and not the exact method by which this result is achieved. For this reason, the proposed method of injecting melted fatty substances lends itself to different interpretations concerning the exact execution of the process. This result can be achieved in two ways. First, and obviously the preferred method, is by the flushing of the whole circulatory system of the food animal with a heated edible salt solution to insure the maintenance of a sufficiently high temperature in the system to prevent immediate solidification of the injected fats, and the filling of said system so cleansed and heated with fats. But it is obvious from the above considerations and descriptions that if the injection substance is introduced into the aorta or into any other part of the blood circulatory system prior to the flushing out of all or part of the blood the melted fat will displace and replace the blood directly from the blood vessels and, consequently, the blood channels will become filled with the melted fat less completely than by the preferred method. Secondly, then, the objects of the invention may be achieved by the injection of the melted fat directly into the blood circulatory system without previous flushing of the blood. In the same vein, it is evident that it is not essential for the purposes of the invention that the heart of the stunned animal still be functioning since the detergent and the injection fluids are being conveyed through and into the blood circulatory channels under pressure.

I claim:

1. The artificial feeding process for cattle which comprises flushing the blood from the circulatory system of the cattle with a heated edible salt solution at the time of slaughter, whereby the heated solution maintains the temperature level of the system and prevents contraction and collapse of the circulatory system, and injecting melted fats into said system to replace the blood.

2. The artificial feeding process for grass-fed cattle which comprises flushing the blood from the circulatory system of the cattle with a heated edible salt solution at the time of slaughter, whereby the heated solution maintains the temperature level of the system and prevents contraction and collapse of the circulatory system, and injecting melted fats derived from corn-fed cattle into said system to replace the blood.

3. The artificial feeding process for grass-fed cattle which comprises flushing the blood from the circulatory system of the cattle with a heated edible salt solution at the time of slaughter whereby the heated solution maintains the temperature level of the system and prevents contraction and collapse of the circulatory system, injecting melted fats derived from corn-fed cattle into said circulatory system and cooling said injected cattle below the melting point of the fats.

4. The artificial feeding process for food animals of the group consisting of cattle, sheep and hogs which comprises flushing the blood from the circulatory system of an animal at the time of slaughter with a heated edible detergent solution, whereby the heated solution maintains the temperature level of the circulatory system and prevents contraction and collapse thereof, and injecting melted fats into said circulatory system to replace the blood.

5. The artificial feeding process for food animals of the group consisting of cattle, sheep and hogs, which comprises flushing the blood from the circulatory system of an animal at the time of slaughter with an edible detergent solution heated to a temperature of about 41° centigrade, whereby the heated solution maintains the temperature level of the circulatory system and prevents contraction and collapse thereof, and injecting melted fats into said circulatory system to replace the blood.

OSCAR E. SCHOTTÉ.

REFERENCES CITED

The following references are of record in the file of this patent:

UNITED STATES PATENTS

| Number | Name | Date |
|---|---|---|
| 2,128,952 | Mareta | Sept. 6, 1938 |
| 2,351,614 | Hills et al. | June 20, 1944 |
| 2,418,914 | Tichy | Apr. 15, 1947 |

FOREIGN PATENTS

| Number | Country | Date |
|---|---|---|
| 33,224 | France | Aug. 20, 1928 |
| 39,026 | France | Aug. 26, 1931 |